United States Patent [19]

Welch et al.

[11] Patent Number: 4,803,954

[45] Date of Patent: Feb. 14, 1989

[54] CRAWLING INSECT-PROOF PET BOWL APPARATUS AND METHOD

[76] Inventors: Harland A. Welch, 13005 Pollard Dr., Austin, Tex. 78727; Lorenzo Perales, 8307-A Bowling Grn.; Don Livingston, 8206 Exmoor Dr. #B, both of Austin, Tex. 78758

[21] Appl. No.: 37,580

[22] Filed: Apr. 13, 1987

[51] Int. Cl.$^4$ ............................................... A01K 5/00
[52] U.S. Cl. ........................................................ 119/61
[58] Field of Search ................... 119/61, 51.5, 62, 58, 119/63; 43/131, 133, 134, 136

[56] References Cited

U.S. PATENT DOCUMENTS

| | | | |
|---|---|---|---|
| 1,552,076 | 9/1925 | Mosier | 119/61 |
| 1,964,611 | 6/1934 | Watson | 43/131 |
| 1,994,859 | 3/1935 | Langum | 43/131 |
| 3,488,879 | 1/1970 | Laughlin | 43/131 |
| 4,691,664 | 9/1987 | Crowell | 119/61 |

*Primary Examiner*—Gene Mancene
*Assistant Examiner*—R. Thomas Price
*Attorney, Agent, or Firm*—John Nevin Shaffer, Jr.

[57] ABSTRACT

A crawling insect-proof pet bowl having an outer liner with upwardly sloping sides and downwardly sloping lip. An inner liner that conforms to the outer liner but that has upwardly extending sides that angle away from the sides of the outer liner and thereby forms a gap. The inner liner has a downwardly sloping lip that extends beyond the peak of the inner liner and partially down the downwardly sloping lip of the outer liner. The tip of the outer liner extends beyond the tip of the inner liner so that if the bowl is pushed against an object, such as a wall, direct access to the inner liner bowl is prevented. The gap formed by the upwardly extending sides of the outer and inner liner forms a barrier to the crawling insects and is particularly effective when armed with a biodegradable substance such as petroleum jelly. As a result, a spill-proof, long life, barrier to crawling insects is provided that is non-toxic, biodegradable, and easy to replace and clean.

8 Claims, 2 Drawing Sheets

CRAWLING INSECT-PROOF PET BOWL APPARATUS AND METHOD

BACKGROUND OF THE INVENTION

This invention relates to an improved crawling insect-proof pet bowl for preventing crawling insects, such as ants, from reaching the contents of a pet bowl.

The problem of preventing ants and other crawling insects from entering pet food bowls has been addressed in a variety of manners. Typically, however, prior art solutions have focused on surrounding the bowl with a "moat" of water. U.S. Pat. Nos. 2,191,811; 2,584,301; 4,007,711; 4,128,080; and 4,357,905 all utilize this old "moat" mechanism in order to accomplish the same objective.

Trampier, U.S. Pat. No. 2,191,811, utilizes a single piece divided bowl with a lower, outer moat to be filled with water. Trampier also provides for the maintenance of water in the outer moat by access from the water bowl portion of the divided dish into the moat.

Sinclair, U.S. Pat. No. 2,584,301, describes a "moated dog feeder" wherein ordinary bowls are suspended above moats filled with water in a fabricated stand which is itself supported off the ground.

Michael, U.S. Pat. No. 4,007,711, discloses an "antipest pet dish" that utilizes the moat principal in combination with a support system to elevate the bowl to the desired height either through telescopic legs or tapered sectional pedestals. Michael provides a top for his pet dish.

Haney, U.S. Pat. No. 4,128,080, discloses a two section water dish above one section of which has been suspended a food dish.

Carpenter, U.S. Pat. No. 4,357,905, discloses a "moated pet feeder" which combines a two section water bowl filled with water, into one section of which an ordinary food dish is placed so that water surrounds the food dish.

Each of the above described patents are awkward in that in order to function properly they must be "armed" with adequate amounts of water to achieve their stated purpose. If these bowls are kicked or bumped for some reason, water spills out and the stated purpose is diminished or defeated altogether. Additionally, if these bowls are to be used in the outdoors, there is the natural problem of constant "rearming" with water lost due to evaporation. Further, each of these prior bowls are awkward to transport once they have been filled with water and messy to deal with as a result.

A still further drawback to these prior art devices is that none of them prevent access to the water or pet food sections if they are placed in contact with a wall, dog house, or support of any type such as a fence, tree or shrub. That is, when these devices are placed, or accidentally come in contact with such objects, a direct path to the water and/or food bowl is provided that avoids the water "moat".

Thus, there is a need in the art for providing a crawling insect-proof pet bowl which does not require intricate loading or "arming" in order to function and which does not require constant reloading and arming in order to continue to function. Further, there is a need in the art for providing a crawling insect-proof pet bowl that prevents the introduction of crawling insects to the food and water areas should the device come into contact with a wall or some other object which provides a passage way for insects.

SHORT STATEMENT OF THE INVENTION

Accordingly, the crawling insect-proof pet bowl of the present invention includes a generally concave outer liner with a flat bottom and upwardly extending sides. The peak portions of the upwardly extending sides are ultimately turned downward to form a sloping lip that extends down and away from the upwardly extending sides. An inner liner, that forms the pet bowl proper, is removably attachable to the outer liner by means of a snap. The base of the inner liner, pet bowl, conforms to the base of the outer liner. The inner liner, pet bowl, also has upwardly extending sides, that conform to but do not touch the upwardly sloping sides of the outer liner. The pet bowl sides, in fact, diverge from the sides of the outer liner so that a gap of $\frac{1}{2}''$ or more is formed. Additionally, the inner liner's sides extend above and beyond the upwardly sloping sides of the outer liner and then, in similar fashion, peak and turn down and angle away from the downwardly sloping sides of the outer liner. The downward sloping lip of the pet bowl, however, extends only part way down the lip of the outer liner so that the outer liner protrudes beyond the lip of the inner liner some measurable distance.

As a result of this configuration, the crawling insect-proof pet bowl of the present invention can be "armed" simply and easily by removing the pet bowl and coating the inner upward sloping sides of the outer liner and the outer upwardly extending sides of the inner liner with a biodegradable coating such as petroleum jelly. Once so "armed" and reassembled the bowl can be handled as an ordinary empty bowl would be with no fear of "spilling" the water, or any other material utilized to form the moat, as in prior art inventions. Additionally, this invention can remain "armed" day after day, after day without need of rearming as a result of evaporation, spillage, or other debilitating incidents common with prior art inventions.

Further, the unique design of the present invention provides a "wall bumper" by means of the far reaching extension of the sloping lip of the outer liner. As a result of this construction, no matter whether the device is placed in contact with a wall, dog house, fence, etc., the functional utility of the device is not defeated. That is, even if crawling insects utilize the contacting structure to climb onto the lower lip they will still be prevented from entering the water or pet food bowl by means of the gap construction and the biodegradable coating, and because of the fact that the downwardly sloping lip of the inner liner stops short of the full extension of the lower lip. As a result, no direct contact may be made between the upper lip and any obstruction against which the bowl might be placed or inadvertently come in contact.

BRIEF DESCRIPTION OF THE DRAWINGS

Other objects, features, and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
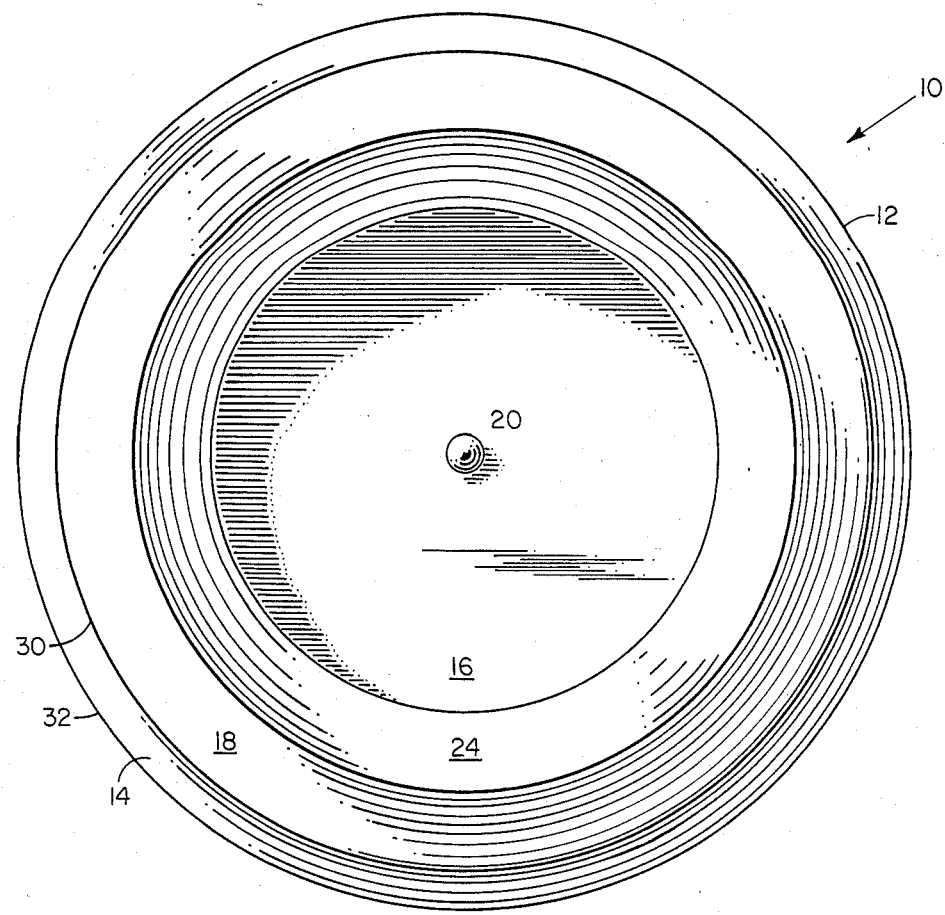
FIG. 1 is a top view of a preferred embodiment of the crawling insect-proof pet bowl.
Figure 2:
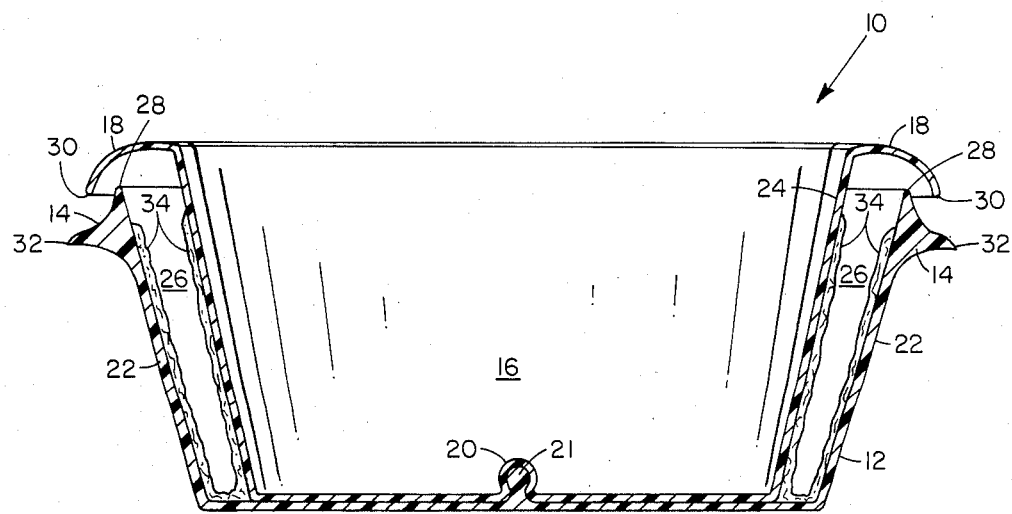
FIG. 2 is a side sectional view taken along the lines of 2—2 of FIG. 1.
Figure 3:
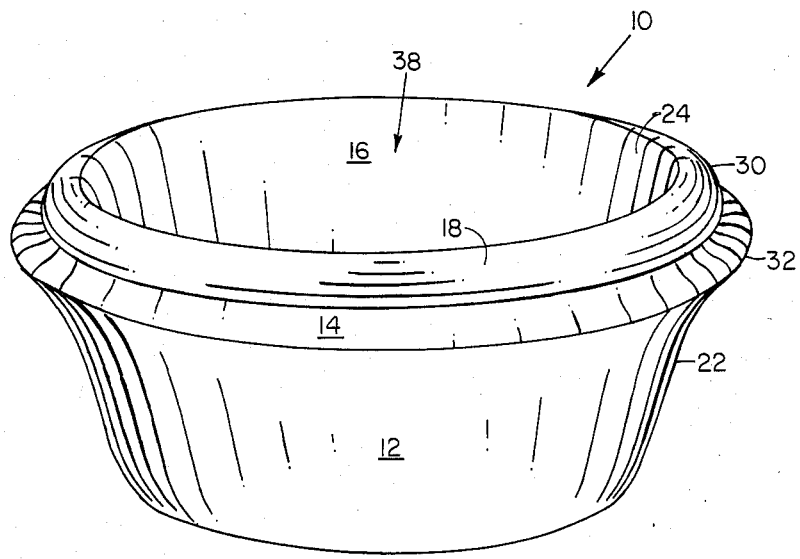
FIG. 3 is a perspective view of the bowl in FIG. 1.

The preferred embodiment of the present invention is illustrated by way of example in FIGS. 1-3. With specific reference to FIG. 1, a crawling insect-proof pet bowl 10 includes an outer liner 12 with downwardly sloping lip 14. Also illustrated in FIG. 1 is inner liner 16 with a second downwardly sloping lip 18. Also shown in FIG. 1 is bulge 20 designed to conform to protrusion 21 and "snap" over protrusion 21 to join inner liner 16, and be removably attachable to, outer liner 12 when so desired.

Referring now to FIG. 2, the unique construction of the invention is more clearly revealed. For instance, it is clearly shown that outer liner 12 has upwardly extending sides 22 to which first downwardly sloping lip 14 is attached. Also, it is clear from FIG. 2 that inner liner 16, removably attached to outer liner 12 by means of bulge 20 and protrusion 21, has upwardly extending sides 24 that conform generally in angle to upwardly extending sides 22 but which are angled away from the upwardly extending sides 22 so that a gap 26 is formed. Gap 26 extends substantially from the bases of inner liner 16 and outer liner 12 and extends upward and beyond both upwardly extending sides 22 and 24 and is maintained further in the relationship between the first downwardly sloping lip 14 and the second downwardly sloping lip 18.

As clearly shown in FIG. 2, second downwardly sloping lip 18 extends beyond the peak 28 of downwardly sloping lip 14. Nonetheless, the tip 30 of second downwardly sloping lip 18 projects only part way down first downwardly sloping lip 14 and comes to a stop somewhere short of the tip 32 of downwardly sloping lip 14. As shown in FIG. 3, downwardly sloping lip 14 extends beyond the end of tip 30 so that when and if tip 32 is pushed accidentally or placed against a form, such as a wall 36, fence, etc., thereby providing a path for crawling insects onto lip 14, lip 18 is sufficiently placed some distance away from the wall 36, etc. As a result, no direct path to the inner liner 16 is provided.

As further shown in FIG. 2, gap 26 is most effectively utilized by the insertion of a biodegradable substance 34, such as petroleum jelly. Application of biodegradable substance 34 is accomplished by removal of inner liner 16, through utilization of the snap together nature of bulge 20 and protrusion 21, and subsequent application of a thin layer of petroleum jelly on the facing sides of upwardly extending sides 22 and 24. When inner liner 16 is re-attached to outer liner 12, a continuous obstructive path for crawling insects through the biodegradable substance 34 is provided. It is obvious to use a non-biodegradable substance of some sort, but a biodegradable, non-toxic substance is preferred.

Once device 10 is "armed" in this manner, pet bowl 10 may be filled with water 38, dog food, or any other desired substance and transported easily and simply without fear of spilling as in previous devices. Additionally, once biodegradable substance 34 is applied, it may be left on device 10 for extended periods of time without the old necessity of "re-arming" with water lost through evaporation, spillage, etc.

When it is desired to renew biodegradable substance 34, inner liner 16 is removed from outer liner 12, biodegradable substance 34 wiped clean, and a new application applied as previously described.

As a result, a crawling insect-proof pet bowl is provided that is simple in construction, easy to use and requires no constant attention to maintain its effectiveness. Further, the device effectively prevents direct access to the inner pet bowl 16 because of the unique extended lip 14 of outer liner 12. Additionally, the gap 26, especially when coated with biodegradable substance 34, presents an obstacle to crawling insects that may not be surmounted. Further, by utilization of biodegradable substance 34 as opposed to prior art uses of water and other liquids, a non-toxic, essentially renewal free barrier is provided.

While the present invention has been disclosed in connection with the preferred embodiment thereof, it should be understood that there may be other embodiments which fall within the spirit and scope of the invention as defined by the following claims.

What is claimed is:

1. A crawling insect-proof pet feed bowl comprising:
   (A) an outer liner with upwardly extending sides attachedto a base;
   (B) a first downwardly sloping lip formed at an upper limit of said outer liner's upwardly extending sides;
   (C) a removably attachable inner liner with upwardly extending sides that conform to said outer liner's upwardly extending sides but which touch said outer liner only at a base of said inner liner and which sides gradually angle away from said outer liner so that a gap with walls is accomplished; wherein crawling insects are trapped and cannot escape by a non-toxic barrier means applied to the walls of said gap
   (D) a second downwardly sloping lip formed at an upper limit of said inner liner that conforms with said first downwardly sloping lip and maintains said gap but which extends only part way down said first sloping lip.

2. The crawling insect-proof pet bowl of claim 1 wherein said first and second downwardly sloping lips further comprise:
   (A) a first tip on said first downwardly sloping lip that projects beyond a second tip on said second downwardly sloping lip; and
   (B) said second tip on said second lip which extends past a peak on said first downwardly sloping lip but which terminates part way down said first downwardly sloping lip so that when said pet bowl is pushed against an object, said first tip prevents said second tip from coming in contact with said object.

3. The crawling insect-proof pet bowl of claim 2 further comprising a biodegradable, non-toxic barrier means applied to the walls of said gap.

4. The crawling insect-proof pet bowl of claim 3 wherein said biodegradable substance is petroleum jelly.

5. A crawling insect-proof feed pet bowl comprising:
   (A) an outer liner with upwardly extending sides attached to a base;
   (B) a first downwardly sloping lip formed at an upper limit of said outer liner's upwardly extending sides;
   (C) a removably attachable inner liner with upwardly extending sides that conform to said outer liner's upwardly extending sides but which touch said outer liner only at a base of said inner liner and which sides gradually angle away from said outer liner so that a gap with walls is accomplished;
   (D) a second downwardly sloping lip formed at an upper limit of said inner liner that conforms with said first downwardly sloping lip and maintains said gap but which extends only part way down said first sloping lip;

(E) a first tip on said first downwardly sloping lip that projects beyond a second tip on said second downwardly sloping lip;

(F) said second tip on said second lip which extends past a peak on said first downwardly sloping lip but which terminates part way down said first downwardly sloping lip so that when said pet bowl is pushed against an object, said first tip prevents said second tip from coming in contact with said object; and (G) a biodegradable, non-toxic barrier means applied to the walls of said gap so that crawling insects are trapped and cannot escape.

6. The crawling insect-proof pet bowl of claim 5 wherein said biodegradable substance is petroleum jelly.

7. A method of providing a crawling insect-proof feed pet bowl comprising the steps of:

(A) forming an outer liner with upwardly extending sides;

(B) forming a first downwardly sloping lip at the upper limit of said outer liner's upwardly extending sides attached to a base;

(C) constructing a removably attachable inner liner with upwardly extending sides that conform to said outer liner's upwardly extending sides but which touches said outer liner only at an base of said inner liner and which said inner liner's sides, gradually angle away from said outer liner so that a gap with walls is accomplished;

(D) constructing a second downwardly sloping lip at an upper limit of said inner liner that conforms to said first downwardly sloping lip of said outer liner and which maintains said gap but which extends only part way down said first sloping lip; and (E) applying a biodegradable, non-toxic barrier means in a thin coating to the walls of said gap so that crawling insects are trapped and cannot escape.

8. The method of providing a crawling insect-proof pet bowl of claim 7, wherein the step of providing a second downwardly sloping lip further comprises the steps of:

(A) extending a first tip on said first lip beyond a second tip on said second lip; and (B) extending said second tip on said second lip past a peak on said first lip, wherein said second tip terminates part way down said first downwardly sloping lip so that when said pet bowl is pushed against an object, said first tip prevents said second tip from coming in contact with said object.

* * * * *